(12) United States Patent
Miura et al.

(10) Patent No.: US 6,521,697 B2
(45) Date of Patent: Feb. 18, 2003

(54) UN-SINTERED POLYTETRAFLUOROETHYLENE PROCESSED ARTICLE

(75) Inventors: Toshiro Miura, Settsu (JP); Yoshihiro Soda, Settsu (JP); Tadao Hayashi, Settsu (JP)

(73) Assignee: Dainkin Industries, Ltd., Osaka (JP)

( * ) Notice: Subject to any disclaimer, the term of this patent is extended or adjusted under 35 U.S.C. 154(b) by 88 days.

(21) Appl. No.: 09/769,264

(22) Filed: Jan. 26, 2001

(65) Prior Publication Data

US 2001/0011447 A1 Aug. 9, 2001

(30) Foreign Application Priority Data

Jan. 28, 2000 (JP) ........................................ 2000-020720

(51) Int. Cl.⁷ .............................. C08J 5/24; C08L 27/12
(52) U.S. Cl. ...................... 524/546; 524/244; 524/540; 524/544; 528/401; 428/35.2; 428/421
(58) Field of Search ................................. 524/244, 540, 524/544, 545, 546; 528/401; 428/35.2, 421

(56) References Cited

U.S. PATENT DOCUMENTS 5,750,606 A * 5/1998 Miura et al. ................. 524/244

* cited by examiner

*Primary Examiner*—Duc Truong
(74) *Attorney, Agent, or Firm*—Sughrue Mion, PLLC

(57) ABSTRACT

To provide an un-sintered polytetrafluoroethylene processed article which has an un-sintered polytetrafluoroethylene layer formed by coating and/or impregnating with an aqueous dispersion of PTFE and is characterized in that a content of alkyl phenols detected from the un-sintered PTFE layer is not more than 0.1 ppm. The un-sintered PTFE-processed article scarcely contains alkyl phenols which are suspected as chemical substances having endocrine disrupting activity.

6 Claims, No Drawings

UN-SINTERED POLYTETRAFLUOROETHYLENE PROCESSED ARTICLE

BACKGROUND OF THE INVENTION

The present invention relates to an un-sintered polytetrafluoroethylene (PTFE) processed article having an un-sintered PTFE layer formed by coating and/or impregnating with an aqueous dispersion of PTFE and then treating at a temperature of not more than a melting point of PTFE.

Chemical substances doubted having endocrine disrupting activity which are publicized by "Research group for a problem with exogenous endocrine disruptor" of Environment Agency of Japan are doubted disrupting endocrine activity of animals and causing hypogonadism and malignant tumor. Thus there is a concern about influences thereof on environment.

While alkyl phenols such as octyl phenol and nonyl phenol are included in those substances, they have been used as a starting material of a nonionic surfactant for stabilizing an aqueous dispersion of PTFE and therefore a slight amount of alkyl phenols are detected from the un-sintered PTFE layer formed by coating and/or impregnating with the aqueous dispersion of PTFE containing such a surfactant and there is a fear of causing environmental contamination.

Namely polyoxyethylene octyl phenol ether which is a nonionic surfactant has been generally used for conventional aqueous dispersion of PTFE and contains octyl phenol as a starting material in an amount of several hundred ppm. Octyl phenol is also contained in un-sintered articles such as fluorine-containing knitted gland packing and filter bag produced by using the aqueous dispersion of PTFE. For example, about 0.7 ppm of octyl phenol is detected from the fluorine-containing knitted gland packing, and about 0.2 ppm of octyl phenol is detected from the filter bag.

If the un-sintered article is sintered, octyl phenol is reduced to not more than a detection limit. However though the fluorine-containing knitted gland packing is required to have air-tightness and lubricity and the filter bag is required to have air-tightness and flexibility, such properties cannot be obtained in case where they are sintered.

An object of the present invention is to provide an un-sintered PTFE processed article scarcely containing alkyl phenols which are under suspicion of being chemical substances having endocrine disrupting activity.

SUMMARY OF THE INVENTION

Namely the present invention relates to the un-sintered PTFE processed article which has an un-sintered PTFE layer formed by coating and/or impregnating with an aqueous dispersion of PTFE and is characterized in that a content of alkyl phenols detected from the un-sintered PTFE layer is not more than 0.1 ppm.

It is preferable that the article is a fluorine-containing gland packing or a filter bag.

Also it is preferable that a content of PTFE in the article is not less than 20% by weight.

DETAILED DESCRIPTION

PTFE to be used in the present invention encompasses not only tetrafluoroethylene homopolymer but also a modified PTFE prepared by copolymerizing other monomer in a small amount not imparting melt-flowability. Examples of the comonomer are hexafluoropropylene, chlorotrifluoroethylene, perfluoro(alkyl vinyl ether), perfluoro(alkoxy vinyl ether), trifluoroethylene, perfluoroalkyl ethylene, and the like. A copolymerizing ratio of the comonomer varies depending on kind thereof. For example, when perfluoro(alkyl vinyl ether) or perfluoro(alkoxy vinyl ether) is used, it is preferable that an amount thereof is usually up to 2% by weight, more preferably 0.01 to 1% by weight.

For example, the aqueous dispersion of PTFE to be used in the present invention is prepared as follows.

First the above-mentioned monomer is emulsion-polymerized in an aqueous medium containing a polymerization initiator, dispersing agent and polymerization stabilizer to give an aqueous dispersion comprising 15 to 35% by weight of fluorine-containing polymer particles having an average particle size of 0.1 to 0.5 $\mu$m. Examples of the polymerization initiator are, for instance, ammonium persulfate, disuccinic acid peroxide, and the like, examples of the dispersing agent are, for instance, ammonium perfluorocarboxylate having 7 to 10 carbon atoms, and the like, and examples of the polymerization stabilizer are, for instance, higher paraffin, and the like. It is a matter of course that those additives to be used do not contain alkyl phenols.

Since such a concentration of the aqueous dispersion is too thin for industrial uses, usually in order to increase the concentration of the fluorine-containing polymer and enhance stability thereof, after stabilizing by adding a surfactant, a solid content of the polymer is condensed to 40 to 70% by weight by phase separation concentration and membrane separation concentration, followed by adding pure water, ammonia water, antiseptic agent and polyoxyethylene alkyl ether surfactant to dilute to 30 to 65% by weight.

The surfactant to be used preferably is polyoxyalkylene alkyl ether surfactant represented by the formula:

R-O-A-H wherein R represents a linear or branched alkyl group having 5 to 18 carbon atoms, preferably 10 to 16 carbon atoms, A represents a polyoxyalkylene chain having 5 to 20 oxyethylene groups and 0 to 6 oxypropylene groups. Examples of the alkyl group R are decyl, lauryl, tridecyl, cetyl, stearyl, and the like, and the alkyl group may be linear or branched. Particularly from the viewpoint of excellent surface activity, water solubility and availability, preferred is a polyoxyalkylene alkyl ether surfactant in which R is an alkyl group having 10 to 16 carbon atoms and the polyoxyalkylene chain comprises 7 to 15 oxyethylene groups and 0 to 3 oxypropylene groups. Also it is preferable that a surface tension of the aqueous solution of surfactant is low from the viewpoint of good permeability into the substrate. As a starting material for the surfactant, natural or synthetic higher alcohol may be used. However it is a minimum requirement that the starting material does not contain alkyl phenols at all.

It is preferable that an adding amount of the polyoxyalkylene alkyl ether surfactant is from 3 to 20 parts by weight based on 100 parts by weight of PTFE.

For the purpose of dilution, pure water, water soluble solvent, various hydrocarbon type surfactants containing no alkyl phenol, or the like may be added optionally. Also a fluorine-containing surfactant or silicone type surfactant may be added as a leveling agent, and a viscosity may be adjusted by adding a thickener, rheology control agent, salts containing various water soluble electrolytes, or the like Also as case demands, an antiseptic agent, coloring agents such as a dye and pigment, graphite and various fillers for enhancing strength and other known components may be added.

The so-obtained aqueous dispersion of PTFE is stuck on a substrate by coating and/or impregnating through usual method and then dried at a temperature of not more than a melting point of PTFE to give an un-sintered PTFE processed article. A coating amount may be optionally selected depending on purpose and application.

According to the present invention, alkyl phenols are contained in the so-obtained un-sintered PTFE layer in an amount of only not more than 0.1 ppm, desirably not more than a detection limit.

The un-sintered PTFE processed article of the present invention can be used for various applications, particularly suitably for a fluorine-containing knitted gland packing and filter bag.

A gland packing is a general term of packings which are put in a gland part (box type) and used for sealing of rotating and reciprocating motion. The gland packing is produced by dipping a carbon fiber-, asbestos- or PTFE fiber-knitted article into an aqueous dispersion of PTFE and drying at 100° to 150° C. There is a case where the article is semi-sintered at about 250° C. which is not more than a melting point (325° to 345° C.). Further there is a case where a lubricant (for example, grease and oil) and a filler (for example, graphite) are added in the aqueous dispersion of PTFE. An object of treating at a temperature of not more than a melting point is to impart flexibility to a product, not to lower sealing property even in case of improper handling and to give dimensional flexibility.

The fluorine-containing knitted gland packing is used for a sealing part of a drive shaft of a screw for vessels, a sealing material for pump and chemical equipment, and the like and particularly a fluorine-containing gland packing is used for applications where chemical resistance, air-tightness, lubricity and non-sticking property are required. Also the gland packing is used for a dynamic equipment having a high friction coefficient and a high peripheral velocity, and a gasket is used for a static equipment having teeth.

The filter bag is in the form of bag to be used for a shielding curtain for high temperature furnaces such as garbage incinerator, for collection of carbon black in production thereof, for collection of fly ash in a coal-burning steam power plant, and the like.

The filter bag is produced by dipping a glass cloth, woven fabric of carbon fiber, or the like in an aqueous dispersion of PTFE and semi-sintering at about 250° C. which is not more than a melting point.

A filler (for example, graphite) may be added in the aqueous dispersion of PTFE for enhancement of strength. An object of treating at a temperature of not more than a melting point is to impart flexibility to the obtained processed article, not to lower sealing property and to enhance a flex life.

Namely for example, in case of a filter bag made of glass fiber, when dislodging a collected dust layer, glass fibers are rubbed with each other, which causes malfunction. In order to prevent it, un-sintered PTFE is stuck on the glass fiber as a sizing agent. It is reported that by providing an un-sintered PTFE layer, a dust collecting efficiency is enhanced and dust removal is easy.

In addition, there are other applications of treating the aqueous dispersion of PTFE at a temperature of not more than a melting point, for example, application for collecting fine particles for preventing generation of dust, various binding applications such as a binding agent for batteries and application for preventing dripping at burning plastics by utilizing fibrillization of PTFE particles.

Then the present invention is explained by means of examples and comparative examples, but is not limited to them.

EXAMPLE 1

TFE was emulsion-polymerized in an aqueous medium in the presence of a polymerization initiator (ammonium persulfate), a dispersing agent (ammonium perfluorocarboxylate) and a polymerization stabilizer (higher paraffin) to give an aqueous dispersion containing 30% by weight of PTFE particles. Then after adding polyoxyethylene isotridecyl ether (DISPANOL TOC: available from NOF CORPORATION, alkyl group having a branched structure, average content of oxyethylene: 8.5) in an amount of 10% by weight based on PTFE (based on the weight of polymer solid content), a pH value of the dispersion was adjusted to 9 to 10 with ammonia water, followed by heating at 55° C. and allowing to stand by cloud point concentration method (phase separation method) to give a concentrated solution having about 70% by weight of solid content. A content of the surfactant was 2.7% by weight based on the weight of polymer solid content.

To the concentrated solution were added 3.3% by weight of the same surfactant (DISPANOL TOC) (based on the weight of polymer solid content), pure water, ammonia water and antiseptic agent to give an aqueous dispersion of PTFE having a solid content of 60% by weight. A content of the surfactant was 6.0% by weight based on the weight of polymer solid content.

A carbon fiber knitted in the form of lattice was dipped in the aqueous dispersion of PTFE, and then heat-treated at 150° C. for three hours to give a processed article having an un-sintered PTFE layer for a fluorine-containing knitted gland packing. A PTFE content thereof was about 60% by weight.

10 Grams of the obtained PTFE processed article was cut off and the coated PTFE layer was subjected to extraction treatment with methanol. Then methanol was distilled off from the extraction solution and the solution was diluted with acetonitrile. The diluted solution was analyzed by liquid chromatography under the following conditions, but alkyl phenols were not detected.

Analyzing conditions

Column: ASAHIPAC GS-310

Eluate: Acetonitrile/water=50/50 (volume ratio)

Flow: 1.2 ml/min

Column temperature: 25° to 28° C.

Detector: UV 230 nm

Detection limit: 0.05 ppm 0.1 Gram of the above-mentioned processed article was put in a glass tube and heated (heating temperature: 225° C. for 10 minutes). After evaporated components were collected in an absorbing tube (silica wool) by using helium gas, rapid heating was carried out, followed by analyzing with a gas chromatography mass spectrometer (GC/MS) under the following conditions. However no alkyl phenols were detected.

Analyzing conditions

Column: UApyl

Temperature condition: Holding at 40° C. for 5 minutes, heating rate: 10° C./min, holding at 320° C. for 5 minutes Ionization: EI Scanning condition: m/z 10 to 400, 0.5 sec/1 scanning Detection limit: 0.05 ppm

EXAMPLE 2

A fluorine-containing knitted gland packing was produced in the same manner as in Example 1 except that an asbestos knitted in the form of lattice was used instead of the carbon fiber knitted in the form of lattice. A content of PTFE was about 30% by weight.

The fluorine-containing knitted gland packing made of asbestos was analyzed with a liquid chromatography and gas chromatography mass spectrometer in the same manner as in Example 1. However no alkyl phenols were detected.

EXAMPLE 3

The same procedures as in Example 1 were carried out except that the surfactant was changed from DISPANOL TOC to polyoxyethylene lauryl ether (EMULGEN 109P available from KAO CORPORATION, linear alkyl chain, 9 oxyethylene groups). A solid content of the obtained concentrated dispersion was about 66% by weight, and a content of the surfactant was 2.7% by weight based on the weight of polymer solid content. To the concentrated dispersion were added 3.3% by weight of the same surfactant EMULGEN 109P (based on the weight of polymer solid content), pure water, ammonia water and antiseptic agent to give an aqueous dispersion of PTFE having a solid content of 60% by weight. A content of the surfactant was 6.0% by weight based on the weight of polymer solid content.

A carbon fiber knitted in the form of lattice was dipped in the aqueous dispersion of PTFE and heat-treated at 150° C. for three hours to give a processed article having an un-sintered PTFE layer for a fluorine-containing knitted gland packing. A PTFE content thereof was about 60% by weight.

With respect to the fluorine-containing knitted gland packing made of carbon fiber, analysis was made under the same conditions as in Example 1 by using a liquid chromatography and gas chromatography mass spectrometer. However no alkyl phenols were detected.

EXAMPLE 4

The same procedures as in Example 1 were carried out except that the surfactant was changed from DISPANOL TOC to polyoxyethylene oxypropylenetridecyl ether (branched alkyl chain, 10 oxyethylene groups, 3 oxypropylene groups). A solid content of the obtained concentrated dispersion was about 66% by weight, and a content of the surfactant was 3.2% by weight based on the weight of polymer solid content. To the concentrated dispersion were added 2.8% by weight of the same surfactant polyoxyethylene oxypropylenetridecyl ether (based on the weight of polymer solid content), pure water, ammonia water and antiseptic agent to give an aqueous dispersion of PTFE having a solid content of 60% by weight. A content of the surfactant was 6.0% by weight based on the weight of polymer solid content.

A carbon fiber knitted in the form of lattice was dipped in the aqueous dispersion of PTFE and heat-treated at 150° C. for three hours to give a processed article having an un-sintered PTFE layer for a fluorine-containing knitted gland packing. A PTFE content thereof was about 60% by weight.

With respect to the fluorine-containing knitted gland packing made of carbon fiber, analysis was made under the same conditions as in Example 1 by using a liquid chromatography and gas chromatography mass spectrometer. However no alkyl phenols were detected.

EXAMPLE 5

A glass cloth was dipped in the aqueous dispersion of PTFE of Example 1, and dried by heating at 250° C. for 10 minutes to give a processed article for a filter bag. A content of PTFE was about 40% by weight.

With respect to the filter bag, analysis was made under the same conditions as in Example 1 by using a liquid chromatography and gas chromatography mass spectrometer. However no alkyl phenols were detected.

Comparative Example 1

The same procedures as in Example 1 were carried out except that the surfactant was changed from DISPANOL TOC to polyoxyethylene octyl phenol ether (TRITON X-100 available from Union Carbide Co., Ltd., 10 oxyethylene groups). A solid content of the obtained concentrated dispersion was about 65% by weight, and a content of the surfactant was 3.2% by weight based on the weight of polymer solid content. To the concentrated dispersion were added 2.8% by weight of the same surfactant TRITON X-100 (based on the weight of polymer solid content), pure water and ammonia water to give an aqueous dispersion of PTFE having a solid content of 60% by weight. A content of the surfactant was 6.0% by weight based on the weight of polymer solid content.

A carbon fiber knitted in the form of lattice was dipped in the aqueous dispersion of PTFE and heat-treated at 150° C. for three hours to give a processed article having an un-sintered PTFE layer for a fluorine-containing knitted gland packing. A PTFE content thereof was about 60% by weight.

With respect to the fluorine-containing knitted gland packing made of carbon fiber, analysis was made under the same conditions as in Example 1 by using a liquid chromatography and gas chromatography mass spectrometer. In the liquid chromatography, 1.0 ppm of octyl phenol was detected, and in the gas chromatography mass spectrometry, 1.5 ppm of octyl phenol was detected.

Comparative Example 2

A glass cloth was dipped in the aqueous dispersion of PTFE of Comparative Example 1, and dried by heating at 250° C. for 10 minutes to give a processed article for a filter bag. A content of PTFE was about 40% by weight.

With respect to the filter bag, analysis was made under the same conditions as in Example 1 by using a liquid chromatography and gas chromatography mass spectrometer. In the liquid chromatography, 0.2 ppm of octyl phenol was detected, and in the gas chromatography mass spectrometry, 0.3 ppm of octyl phenol was detected.

According to the present invention, an un-sintered PTFE-processed article scarcely containing alkyl phenols which are suspected as chemical substances having endocrine disrupting activity can be provided.

What is claimed is:

1. An un-sintered polytetrafluoroethylene processed article having an un-sintered PTFE layer formed by coating and/or impregnating with an aqueous dispersion of PTFE, a content of alkyl phenols detected from said un-sintered polytetrafluoroethylene layer being not more than 0.1 ppm.

2. The article of claim 1, which is a fluorine-containing gland packing.

3. The article of claim 1, which is a filter bag.

4. The article of claim 1, wherein a content of polytetrafluoroethylene in the article is not less than 20% by weight.

5. The article of claim 2, wherein a content of polytetrafluoroethylene in the article is not less than 20% by weight.

6. The article of claim 3, wherein a content of polytetrafluoroethylene in the article is not less than 20% by weight.

* * * * *